Feb. 16, 1960
J. MONDRY
2,925,063
DIPPING APPARATUS
Filed Sept. 28, 1956
2 Sheets-Sheet 1
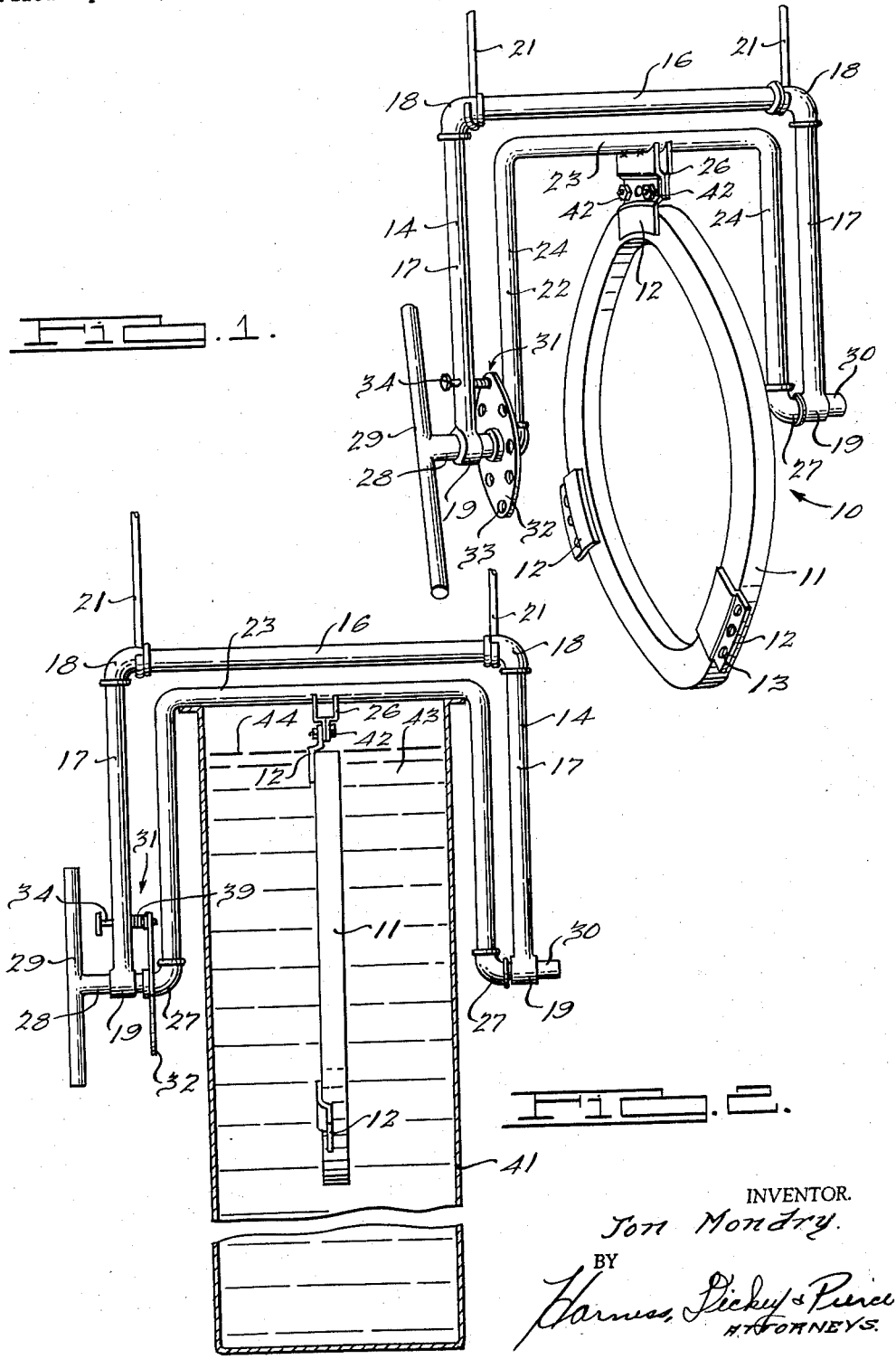
INVENTOR.
Jon Mondry.
BY
Harness, Dickey & Pierce.
ATTORNEYS.

Feb. 16, 1960     J. MONDRY     2,925,063
DIPPING APPARATUS
Filed Sept. 28, 1956     2 Sheets-Sheet 2
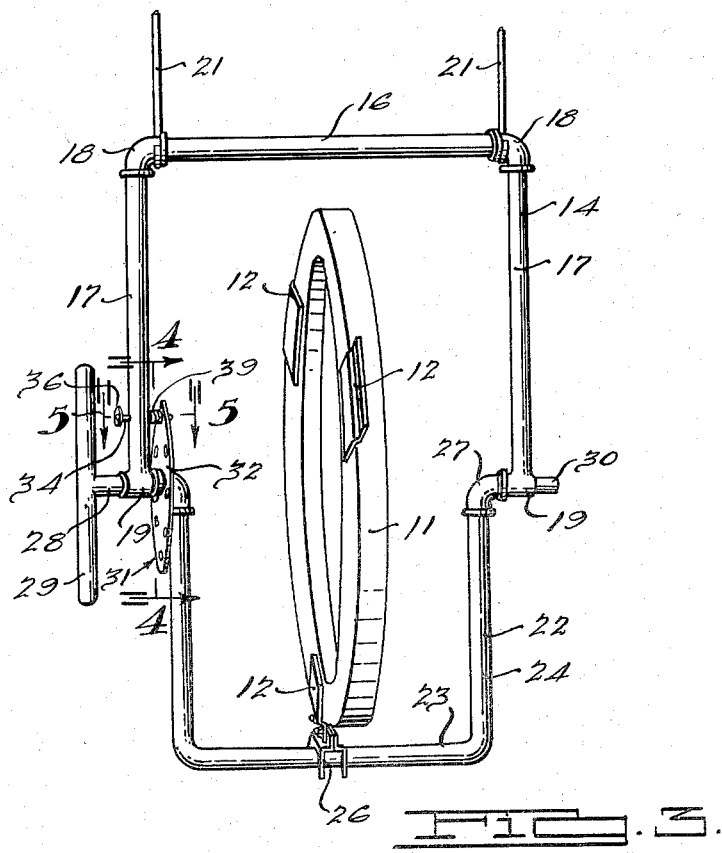
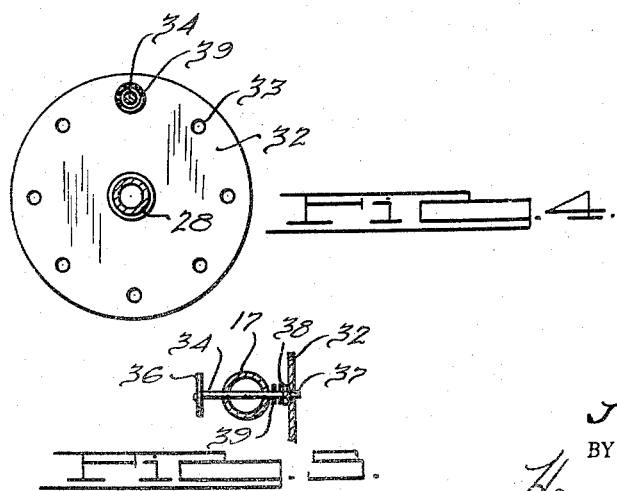
INVENTOR.
Jon Mondry
BY
Harness, Dickey & Pierce.
ATTORNEYS United States Patent Office 2,925,063
Patented Feb. 16, 1960

2,925,063

DIPPING APPARATUS

Jon Mondry, Detroit, Mich., assignor to Michigan Chrome and Chemical Company, Detroit, Mich., a corporation of Michigan Application September 28, 1956, Serial No. 612,723

2 Claims. (Cl. 118—500)

This invention relates generally to coating apparatus and more particularly to apparatus for dipping an article to be coated in a tank.

One method for preventing rusting and deterioration of machine parts is to coat the parts with an organic coating material and one of the most satisfactory and economical methods of coating is to dip the parts in a solution of plastic material, such as a plastisol (a vinyl type thermoplastic coating much like rubber commonly seen on household dish drainer baskets), and then place the coated parts in an oven to bake the plastic material onto the parts. However, the most serious objection to dip coating is that on withdrawal of the parts from the dipping tank, the plastic material sags or runs on the parts so that an uneven coating is applied to the parts. This invention provides apparatus for dipping parts in a plastic solution and then inverting the parts immediately following dipping to eliminate sag of the plastic material and uniformly coat the parts.

An objection of this invention is to provide improved dipping apparatus.

A further object of this invention is to provide apparatus for dipping parts which includes a rotatable part supporting member to provide for rotation of the part after dipping thereof.

Another object of this invention is to provide dipping apparatus which is operable to dip a part supported thereon in a solution without any contact of the solution with the dipping apparatus.

A further object of the invention is to provide apparatus for dipping parts which includes a movable part supporting member that can be maintained in any one of a number of moved positions so that a part can be held in a moved position after dipping.

Still a further object of this invention is to provide dipping apparatus which is simple in construction, economical to manufacture, and efficient in operation in providing a uniform coating on dipped parts.

Further objects, features and advantages of this invention will become apparent from a consideration of the following description when taken in connection with the accompanying drawing in which:

Fig. 1 is a perspective view of the dipping apparatus of this invention, shown in assembly relation with a ring member to be coated;

Fig. 2 is a front elevational view of the dipping apparatus and the ring member illustrated in Fig. 1, showing the ring member in a dipped position in a tank;

Fig. 3 is a perspective view of the dipping apparatus and ring member assembly illustrated in Figs. 1 and 2, showing the dipping apparatus in a moved position for inverting the ring member from the dipped position shown in Fig. 2; and Figs. 4 and 5 are transverse sectional views looking along the lines 4—4 and 5—5, respectively, in Fig. 3.

With reference to the drawing, the dipping apparatus of this invention, indicated generally at 10, is illustrated in Fig. 1 supporting a ring shape member or article 11 to be coated with a plastic material. The article 11 is conveniently provided with three ears 12 each of which is formed with openings 13.

The apparatus 10 includes a main frame 14 of a substantially inverted U-shape having a base or bight portion 16 and a pair of depending leg portions 17 connected to opposite ends of the base portion 16 by elbows 18. The leg portions 17 terminate at their lower ends in tubular bearings 19. The main frame 14 is supported at the elbows 18 on a pair of hooks 21 depending from and movably supported on a track (not shown) for a purpose to appear later.

Mounted on the main frame 14 is a second smaller frame 22 which is likewise of an inverted U-shape, in the position illustrated in Fig. 1, having a base or bight portion 23 and a pair of downwardly extended leg portions 24. A bracket 26, for supporting the article 11, is secured to the base portion 23 in a substantially parallel relation with the leg portions 24. The terminal ends of the leg portions 24 are provided with elbows 27 which carry a pair of horizontal outwardly extended shafts 28 and 30 rotatably supported in the bearings 19 on the main frame 14. The shaft 28 carries a handle 29 positioned outwardly of the main frame 14 for manual manipulation to rotate the shafts 28 and 30 in the bearings 19. On manipulation of the handle 29, the frame 22 is rotatable from the position illustrated in Figs. 1 and 2, in which the frame 22 is within and in a nested relation with the main frame 14, to an inverted position illustrated in Fig. 3 in which the frame 22 extends downwardly from the main frame 14 for a purpose to appear later.

For maintaining the inner frame 22 in a rotated position relative to the main frame 14, a locking unit 31, positioned adjacent the handle 29, is provided. The locking unit 31 includes a flat upright disk member 32 secured to the elbow 27 for the shaft 28 at a position between the adjacent leg portions 17 and 24 for the frames 14 and 22, respectively, and provided with spaced openings 33 arranged about the periphery thereof. A pin 34 (Figs. 2 and 5), having one end 37 of a size to be received in a disk opening 33, is extended through the leg portion 17 adjacent the handle 29 and provided adjacent the end 37 with a stop 38 engageable with the disk 32 to limit movement of the pin 34 through an opening 33. A spring 39 positioned about the pin 34 between the leg portion 17 and the stop 38 urges the pin in a direction toward the disk 32. To facilitate retraction of the pin 34 from an opening 33 and against the action of the spring 39, a head 36 is provided on the outer end of the pin 34.

In use, the apparatus 10 is supported on the hooks 21 from a suitable track (not shown) having provision for raising and lowering the apparatus 10. For example, the track may be of substantially roller-coaster shape having a lower or dip portion (not shown) located above the dipping tank 41 (Fig. 2). An article, such as the ring member 11, illustrated in Figs. 1, 2 and 3, is fastened to the bracket 26 on the inner frame 22 by extending bolts 42 through the openings 13 in one of the ring member ears 12 and the bracket 26.

With the frame 22 in a raised position nested within the main frame 14 (Fig. 1) and locked in this position by the locking unit 31, the hooks 21 are moved along the track to a position in which the ring member 11 is moved into the dipping tank 41 to a position in which it is almost completely submerged in a coating liquid 43. A portion of the ear 12 on the ring member 11 secured to the bracket 26 is maintained above the level 44 of the liquid 43 to prevent coating of the bracket 26 and sticking of the ear 12 to the bracket 26.

The main frame 14 is then moved along the track to raise the ring member 11 out of the tank 41, after which the locking pin 34 is withdrawn from an opening 33 in the disk 32 and the handle 29 is manipulated to rotate the inner frame 22 one hundred and eighty degrees to the position illustrated in Fig. 3 in which the ring member 11 is inverted relative to its position in Figs. 1 and 2. The coating solution which was flowing in one direction as it was setting on the ring member 11 is then caused to flow in an opposite direction to thus even itself out and provide a coating of uniform thickness on the member 11 without any tears or runs.

In one embodiment of the invention the ring member 11 is dipped in a plastisol at room temperature, with the ring member 11 at a temperature of about 200° F. The ring member 11 is then withdrawn and after a twenty to thirty second delay for drainage is rotated one hundred and eighty degrees. At this time the apparatus 10 may also be tilted, by manipulation of the hooks 21, to further insure a uniform coating of the ring member 11. The apparatus 10 along with the ring member 11 is then moved into an oven to bake the plastisol coating onto the ring member 11. Depending upon the particular circumstances, it may be necessary to rotate the ring member forty-five or ninety degrees in opposite directions two or more times with no more than fifteen second intervals between movements, it being understood that by trial and error an operator will determine the temperature, time delay periods and rotation angles best suited for a particular coating material and the specific object being coated.

After the coated ring member 11 has traveled through the oven, it is removed from the apparatus 10 by removal of the bolts 42. The apparatus 10 is then in condition for subsequent use in a similar manner for coating other ring members 11 or similar articles.

From the above description, it is seen that this invention provides a dipping apparatus 10 which is simple in construction, economical to use, and which is easily operated by inexperienced personnel. The dipping apparatus 10 is readily manipulated under various coating conditions to provide the desired uniform application of a coating material to the articles to be coated. While the apparatus 10 has been particularly described with respect to the coating of a single ring member 11 supported thereon, it is apparent that the apparatus 10 can readily support as many as three ring members 11 in the form illustrated in the drawing by merely adding additional supporting brackets 26. Also, by accommodating the size of the tank 41 and the size of the frames 14 and 22 to the desired number of articles to be coated, substantially any number of articles may be coated in a single operation. Since the articles being coated are rigidly supported on the frame 22, no relative movement of the articles on the frame 22 can occur even in the strong heat currents usually found in bake ovens. Accordingly, there is no danger of parts bumping against each other or the frame 22 which by virtue of its U-shape acts as a bumper for preventing other objects from bumping the articles 11 and ruining the coatings thereon. As a result, spacing problems in production are minimized with the apparatus 10. Also, it is apparent that the apparatus 10 is not limited in use to coating the specific ring members 11 illustrated, but can be used in the coating of substantially any shape article by merely adapting the supporting brackets 26 to the article to be supported.

The apparatus 10 may also be used for de-coating or cleaning purposes. In other words, the apparatus 10 may be used in the removal of oil and grease coatings on production parts, such as the ring members 11, prior to a production operation such as coating. In a de-coating operation the parts to be de-coated are suspended in cleaning fumes, such as trichloro-ethylene fumes, from a cleaning solution placed in the bottom of a tank. In most cases the tank for the cleaning solution is larger and deeper than the dipping tank 41 to minimize the escape of fumes into the plant.

The entire apparatus 10 with the parts to be cleaned, such as the ring members 11, are then lowered into the cleaning tank to a position in the area of dense fumes, since subjection of the apparatus 10 to the fumes is not harmful to the apparatus 10. The apparatus 10 is then operated as described above to rotate the parts being cleaned to insure a complete cleaning thereof without any resulting oil puddles on the parts.

It can thus be seen that in production a part is initially assembled on the apparatus and then cleaned and coated before being removed. As a result, a minimum handling of the parts is required. If a primer is to be applied to the part prior to coating, the part is merely dipped in a primer fluid by use of the apparatus 10, prior to coating.

Although the invention has been described with respect to one embodiment thereof, it is to be understood that it is not to be so limited, since changes can be made therein which are within the scope of the invention as defined by the appended claims.

What is claimed is:

1. Apparatus for suspending articles in a tank, said apparatus comprising a pair of inner and outer frames arranged in a nested relation and having pairs of downwardly extended legs, means on the outer one of said frames rotatably supporting the inner one of said frames for rotation about an axis extending between and positioned adjacent the terminal ends of said legs and means on the inner one of said frames spaced from said axis for releasably supporting an article to be suspended in a position depending therefrom and for rotatable movement to a plurality of other positions.

2. Apparatus for dipping articles to be coated in a tank containing a liquid coating material, said apparatus comprising a main frame having a pair of spaced depending leg portions adapted to be arranged on opposite sides of said tank, an article supporting frame having a pair of leg portions arranged between said main frame leg portions, coacting means on said leg portions providing for a rotatable support of said article supporting frame on said main frame, handle means secured to said article supporting frame for rotating said article supporting frame, and manually operable coacting locking means on said frames adjacent said handle means for releasably locking said article supporting frame in predetermined rotated positions relative to said main frame.

References Cited in the file of this patent

UNITED STATES PATENTS

| | | |
|---|---|---|
| 733,831 | Frist | July 14, 1903 |
| 817,408 | Wall | Apr. 10, 1906 |
| 1,851,509 | Hampton | Mar. 29, 1932 |
| 1,978,121 | Winkler | Oct. 23, 1934 |
| 2,351,202 | Hahne | June 13, 1944 |
| 2,389,319 | McMordie et al. | Nov. 20, 1945 |
| 2,588,557 | Morris | Mar. 11, 1952 |
| 2,770,218 | Wilson | Nov. 13, 1956 |

UNITED STATES PATENT OFFICE
CERTIFICATE OF CORRECTION

February 16, 1960

Patent No. 2,925,063

Jon Mondry

It is hereby certified that error appears in the printed specification of the above numbered patent requiring correction and that the said Letters Patent should read as corrected below.

Column 1, line 34, for "objection" read -- object --.

Signed and sealed this 9th day of August 1960.

(SEAL)
Attest:
KARL H. AXLINE
Attesting Officer

ROBERT C. WATSON
Commissioner of Patents